United States Patent

[11] 3,588,815

| [72] | Inventor | Clyde Koonce<br>803 W. 67th St., Odessa, Tex. 79760 |
|---|---|---|
| [21] | Appl. No. | 780,715 |
| [22] | Filed | Dec. 3, 1968 |
| [45] | Patented | June 28, 1971 |

[54] TIRE PRESSURE WARNING DEVICE
7 Claims, 8 Drawing Figs.

[52] U.S. Cl. .................................................. 340/58,
200/61.25
[51] Int. Cl. ...................................................... B60c 23/00
[50] Field of Search ............................................. 340/58;
325/429; 200/61.22, 61.25, 61.26

[56] References Cited
UNITED STATES PATENTS

| 2,860,321 | 11/1958 | Strickland et al. | 340/58 |
|---|---|---|---|
| 3,016,515 | 1/1962 | Summers et al. | 340/58 |
| 3,223,969 | 12/1965 | Course | 340/58 |
| 3,296,535 | 1/1967 | Murray | 325/429 |
| 3,296,590 | 1/1967 | Dalton | 340/58 |
| 3,329,934 | 7/1967 | Wooden | 340/58 |
| 3,374,460 | 3/1968 | Massoubre | 340/58 |

*Primary Examiner*—Alvin H. Waring
*Attorney*—Marcus L. Bates

ABSTRACT: Tire pressure sensors energize a wheel mounted transmitter resulting in generation of an R-F signal when tire pressure decreases below a minimum value. A remote control receiver positioned nearby a vehicle operator senses a transmitted signal and an alarm or indicating device connected thereto alerts the vehicle operator.

Patented June 28, 1971

Clyde Koonce
INVENTOR.

BY *Clarence A. O'Brien*
and *Harvey B. Jackson*
Attorneys

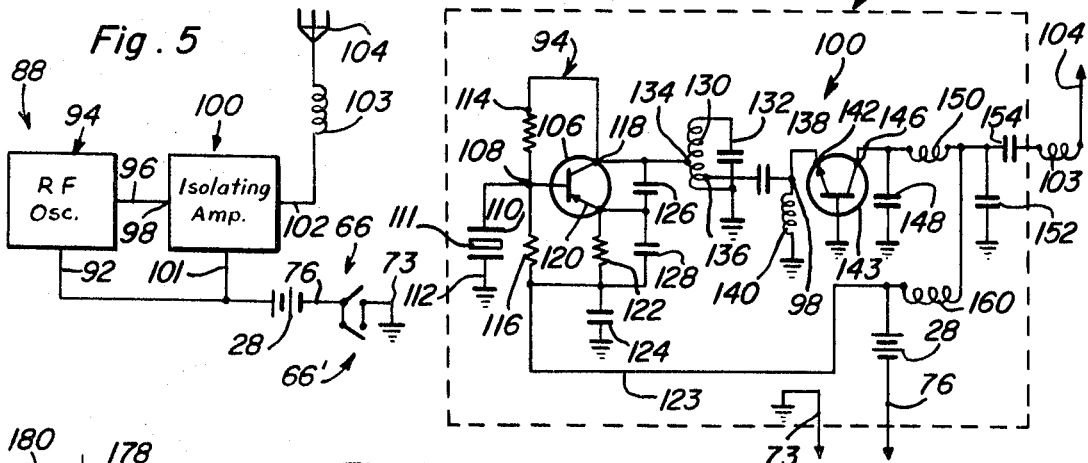
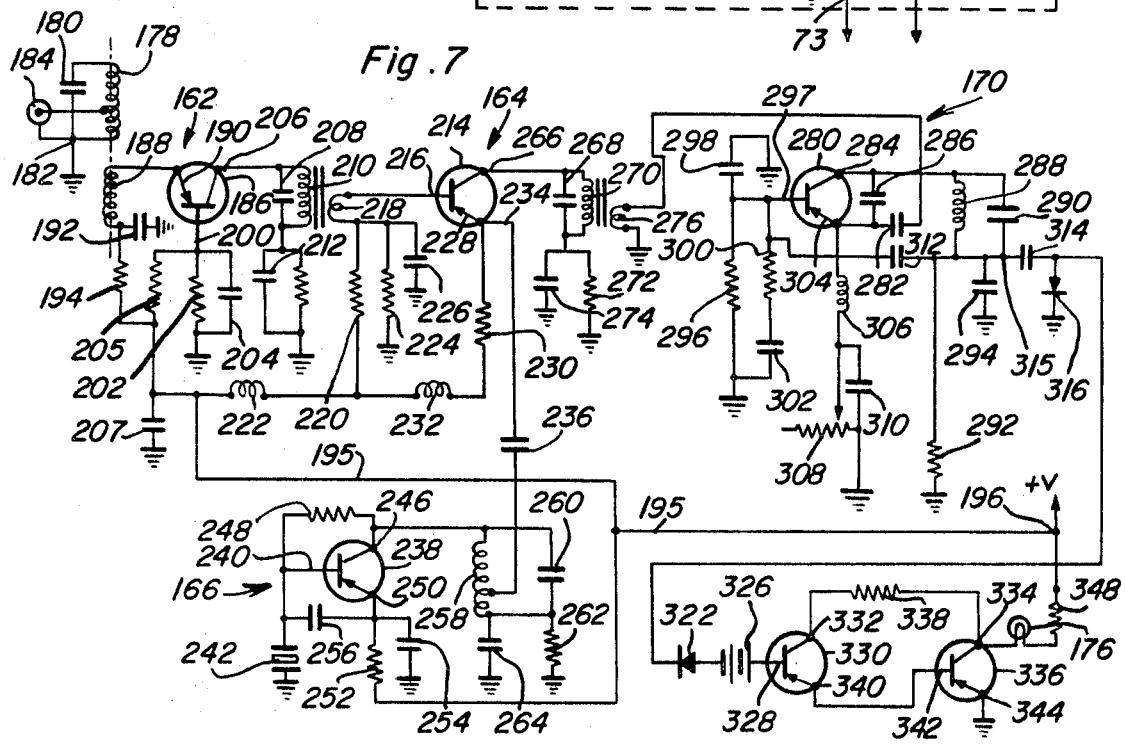
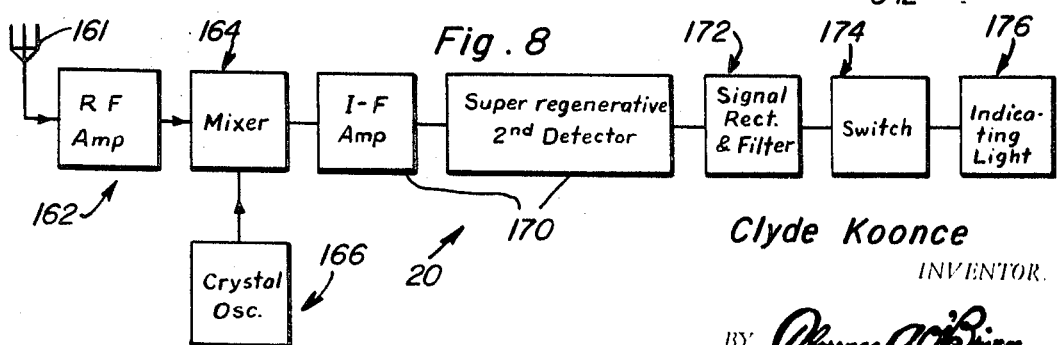
Clyde Koonce
INVENTOR

TIRE PRESSURE WARNING DEVICE

The present invention relates to a remote control radio system and more particularly to a vehicle tire pressure alarm system.

It is most important for motor vehicles utilizing pneumatic tires to maintain a predetermined minimum tire pressure in order to sustain safe and economical vehicle operation. Improperly inflated pneumatic tires wear incorrectly and excessively thereby manifesting rapid change when the vehicle is driven for long periods of time over many miles of road. Regarding safety, a vehicle becomes difficult to control and steer regardless of whether front or rear tires are underinflated. Due to the excessive flexing of the sidewalls, as an underinflated tire rotates, considerable heat may be generated in the tire material with a commensurate breakdown of the tire structure possibly causing the tire material to catch fire.

In the case of tractor-trailer vehicles, the tires of the vehicle may be checked periodically such as at the beginning of a long trip. However, during the course of vehicle operation, a condition of underinflation does not immediately become manifest due to the usual multiwheeled assemblies used in such trailer truck combinations. Therefore, the destruction of a car may occur before the operator becomes aware of a dangerous condition.

The prior art includes several attempts to warn a vehicle operator of an underinflated tire condition by means of utilizing a pressure actuated transmitter mounted on a vehicle wheel. A receiver is generally located in the vehicle cab, the receiver being connected to a remote control alarm device which becomes actuated upon the sensing of a dangerous tire condition. Certain prior art devices employ a single transmitter for each wheel of the vehicle. As will be appreciated, such a redundant installation increases the initial cost as well as the maintenance cost of the equipment. Several known transmitter devices are mounted to the rim of a wheel which causes the transmitter housing to experience excessive centrifugal forces during high speed operation of the vehicle. As the transmitter housing accumulates road mud, snow and the like, the severity of the centrifugal forces increases thereby decreasing the reliability of the transmitter components and the structural securement thereof. Still further, known warning systems include hoses which are connected between the tires and the pressure sensor in a manner necessitating disassembly or removal of the transmitter or hose members during inflation of the tire. As will be appreciated, this procedure causes time consuming inconvenience and delay.

The present invention is addressed to the foregoing problems and includes a solid state transmitter mounted in the center of a vehicle wheel so that the transmitter components experience a minimum amount of centrifugal force thereby extending the useful life of the apparatus. Further, the present invention includes a crystal controlled oscillator the transmitter for providing extremely stable frequency operation under adverse road and weather conditions. Also, a T-connector hose is positioned between the inflated tire and the pressure sensor so that the tire may be inflated in the normal manner without removing or disturbing the components of the present invention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is an electrical schematic diagram illustrating the transmitter in block diagram form.

FIG. 6 is an electrical schematic diagram of the transmitter components.

FIG. 7 is an electrical schematic diagram illustrating the components of the receiver.

FIG. 8 is an electrical block diagram of the receiver.

Figure 1:
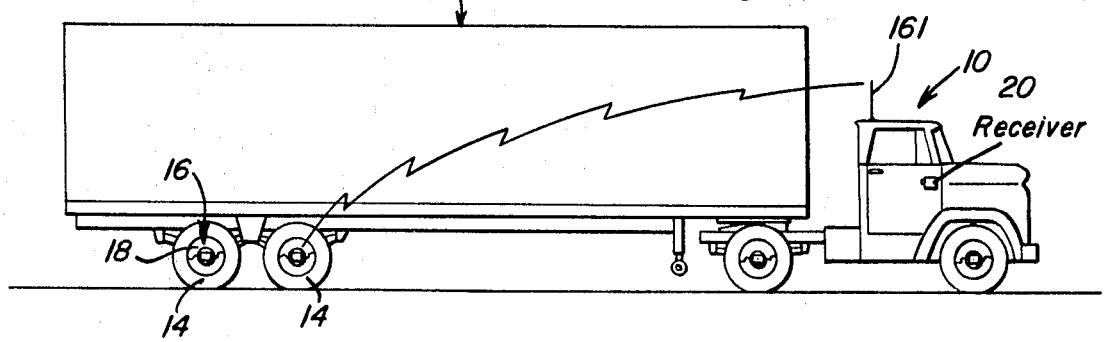
FIG. 1 is a side elevational view of a tractor-trailer diagrammatically illustrating the position of transmitters on the wheels of the vehicle and the position of the receiver in the vehicle cab.

Referring specifically to the drawings, FIG. 1 illustrates a tractor indicated by 10 and a tailer denoted by 12, the units being linked together to form an operative vehicle. The present specification is described in terms of those trailers utilizing dual wheel assemblies 14. However, it will be understood that the principles of the present invention may be adapted to single wheel assemblies such as used in smaller trucks and automobiles. As denoted in FIG. 1, each dual wheel assembly includes a single transmitter device indicated by 16 which is mounted on the axially outward portion of the wheel hub 18 of one of the wheels. In normal operation of the vehicle, the transmitter remains dormant. However, when one or both tires associated with a particular wheel assembly becomes underinflated, the transmitter is energized thereby radiating R-F signals to a receiver 20 located in the vehicle cab 10 as shown. The receiver is a remote control unit connected to an alarm device so that reception of a transmitter signal by the receiver causes the generation of an alarm to alert the vehicle operator of a dangerous condition.

Figure 2:
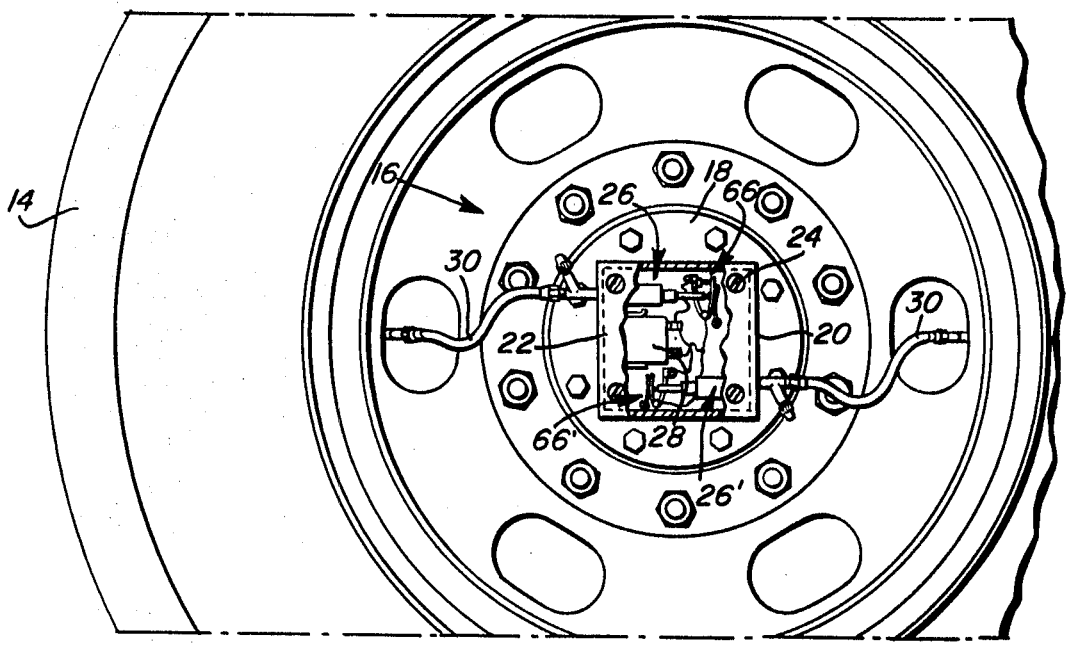
FIG. 2 is a cutaway view illustrating the interior components of the pressure sensor located within a housing mounted to a vehicle wheel.

FIG. 2 illustrates the mounting of the transmitter housing on an axial portion of a wheel 18 so as to minimize the effect of centrifugal force upon the housing and the electrical components therein. The housing 20 is fabricated from a suitably strong and weather-resistant insulative material such as plastic, nylon, fiberglas or the like, to permit the transmission of signals therefrom, without a shielding effect. A cover plate 22 is suitably fastened to the housing 20 by means of appropriate fasteners 24 which permit rapid removal of the cover plate when maintenance of components inside the housing is required.

FIG. 2 shows a first pressure sensor 26 connected to a first tire on a dual wheel assembly by means of a connecting hose 30. A second sensor 26' similar to the first is likewise secured within housing 20 and is connected to the second tire of the dual wheel assembly by means of a second hose 30'. The sensors 26 and 26' are retained in parallel spaced relation with enough space between the sensors to permit removable securement of a miniature battery 28 therebetween. The battery provides electrical power for the transmitter as hereinafter described.

Figure 4:
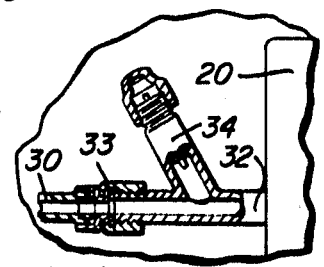
FIG. 4 is a partial sectional view showing a valve stem connection.

Referring to FIG. 4, the pressure hose 30 is connected by a fitting coupling 33 to an inlet tube 32 projecting from the transmitter housing 20. A valve stem portion of the inlet tube 34 appends outwardly from and includes a chamber communicating with the interior passageway of the hose. Thus, as FIG. 2 illustrates, the tire may be inflated through valve stem portion 34 in a normal manner The removal of the transmitter housing or connector hoses.

Figure 3:
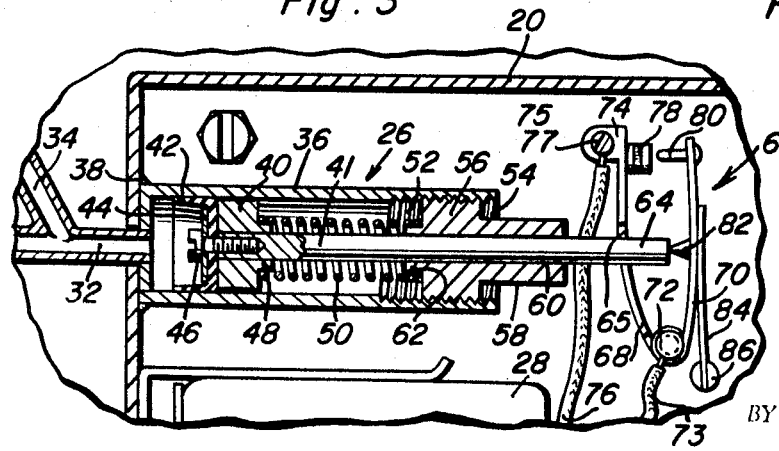
FIG. 3 is a partial longitudinal sectional view showing the pressure sensor in detail.

Referring to FIG. 3, the interior structure of sensor 26 is shown to include a hollowed cylinder 36 suitably connected at a first end thereof to the interior surface of housing 20 by such means as a weld 38 or the like. A cylindrical piston member 40 is concentrically disposed within the cylinder 36, the piston member being centrally bored to receive an axially disposed shaft 41 therethrough. The surface of the piston member 40 confronting the welded end of the cylinder mounts a cup 42 fabricated from a suitable elastomeric and long wearing material. A washer 44 is retained within the cup and fastened therein by a screw 46 which is threadingly inserted along an axial end of shaft 41. The inlet tube 32 passes through an aperture formed in housing 20 and an axially spaced aperture formed in the end of cylinder 36. Thus, communication between the interior of cup 42 and hose 30 is established. As will be noted from FIG. 3, the interior of cup 42 and the inlet end of cylinder 36 seal a pressure chamber pressurized to cause displacement of piston member 40. A boss portion 48 integrally connected to piston member 40 extends axially therefrom opposite to the opening of cup 42. The boss portion is axially bored to permit passage of shaft 41 therethrough. A coil spring 50 is concentrically positioned along an intermediate section of shaft 41 so that one end thereof concentrically engages the outer circumference of boss portion 48. Thus, the position of piston member 40 is determined by the pressure at one end of the piston element and the compressive force of coil spring 50 on the opposite end.

The opposite end of cylinder 36 is threaded as indicated by reference 52. The threads extend from an intermediate portion of the cylinder to an outward end as denoted by 54. A journal member 56 is threadingly positioned within cylinder 36 in mating engagement with threads 52. The inward end of the journal member includes a raised boss 62 for circumferentially receiving an opposite end of coil spring 50 thereon. The outward end of the journal member 56 includes a downwardly stepped cylindrical portion 58 having a bore 60 centrally formed therein to permit the passage of shaft 41 therethrough. Thus, the outward end of shaft 41 extends past the outward end 54 of cylinder 36 as well as the end of outwardly projecting journal member 56. By threadingly varying the position of journal member 56 within cylinder 36, the compressive force exerted by coil spring 50 on piston member 40 may be varied which in turn determines the outward extent of shaft 41 for a particular pressure being experienced by piston member 40.

A point assembly generally indicated by 66 is substantially of the form utilized in automobile ignition systems. The point assembly is positioned in spaced outward relation from end 54 of cylinder 36 so that the outward end 64 of shaft 41 cams against a first levered contact 82 causing switch operation. A first contact arm 68 and a second contact arm 70 are resiliently wound about one another at a centrally disposed pivotal point 72 and positioned with respect to one another to form a generally U-shaped point assembly. Arm 68 includes an aperture therein to permit the passage of shaft end 64 therethrough. The central pivot point 72 includes a suitable insulative element for electrically separating or insulating contact arms 68 and 70. The central pivot point further includes a binding post tab for connecting a lead 73 thereto which in turn allows lead 73 to become electrically connected to switch arm 70. The upward end of arm 68, suitably fastened to a plate member 75, is secured within housing 20. Thus, arm 68 is retained in a substantially fixed position while contact arm 70 is free to flex. A screw fastener 74 connects the outward end 74 of arm 68 to the plate and also furnishes a binding post for a second lead 76. The outward end 74 of arm 68 mounts a contact point 78 thereon which is adapted to mate with a second contact point 80, the latter being mounted on the outward end of contact arm 70. Leads 73 and 76 are connected to the contacts to provide switching action of a transmitter as hereinafter explained. An intermediate point along the length of contact arm 70 includes the contact 82 extending toward contact arm 68. A biasing wire 84 is connected at a first end thereof to contact arm 70, the opposite ends of the wire passing through an aperture 86 formed in plate 75 which serves as a pivotal point for the wire 84. Wire 84 is biased to retain contact arms 68 an 70 is closing relation which in turn biases contacts 78 and 80 to a closed position. The outward end of shaft 41 contacts the projection 82 thereby causing separation of contacts 78 and 80 under normal tire pressure conditions. However, when tire pressure falls below a preselected minimum, piston member 40 is retracted rearwardly due to the overcoming action of coil spring 50 which in turn causes retraction of shaft 41. The piston retraction effects the closing of contacts 78 and 80 thereby energizing transmitter 16 as more fully explained hereinafter.

Thus far, the mechanical operation of the sensors 26 and 26' shown in FIG. 2 has been described. The following discussion deals with the transmitter which becomes energized upon the closing of switch contacts 78 and 80, as shown in FIG. 3. Of course, this condition occurs when the tire pressure falls below a preselected minimum and causes the generation of a signal to be detected by the remote control receiver 20 as seen in FIG. 1. It will be noted that sensors 26 and 26' are associated with similar point assemblies 66 and 66' and both point assemblies enclosed within the housing 20 are connected in parallel so that the closing of one or both point assemblies causes energization of an associated transmitter.

FIG. 5 indicates a block diaphragm of a transmitter as utilized in the present invention. The transmitter is generally indicated by reference numeral 88 and is seen to include a DC source of potential 28 which in terms of the present description is a miniature battery illustrated in FIG. 2. The battery supplies energizing power to an R-F oscillator generally indicated by 94 through a lead 92 connected between a positive battery terminal and the oscillator power input. The positive battery source terminal is also connected to the parallel connected pressure actuated switches 66 and 66' through lead 76. The switches being of the single pole, single throw type having mutually connected contacts directed to ground through connecting lead 73. The output of oscillator 94 is connected to the input terminals 98 of isolating amplifier 100 through lead 96. The amplifier becomes energized simultaneously with the R-F oscillator through an individual power takeoff lead 101 connected to battery source 28. The isolating amplifier stage insures that weather conditions to which short stub antenna 104 and associated coil 103 are exposed, will not effect the operation of the oscillator. The actual circuit configuration includes the connection of antenna coil 103 to the output of the isolating amplifier through lead 102. Considering the actual circuit components employed in transmitter 88, FIG. 6 illustrates the R-F oscillator 94 which is seen to include a PNP transistor 106 having an input terminal 108 connected to a first terminal 110 of a crystal 111. The crystal injects an input signal at a stable frequency into the base of the transistor. The second terminal 112 of the crystal is grounded. Serially connected resistors 114 and 116 form a voltage divider having a junction point at 108 connected to the base of transistor 106. A first end of the voltage divider is connected to the collector 118 of transistor 106 and the opposite end of the voltage divider is connected to the emitter terminal 120 of the transistor through an emitter load resistor 122. The junction point connecting resistors 116 and 122 is connected to the positive terminal of battery 28 through a power connecting lead 123. Resistors 114 and 116 of the voltage divider serve as biasing resistors for transistor 106. The junction point connecting voltage divider resistor 116 and emitter resistor 122 is connected to grounded capacitor 124 which serves to connect the junction point to ground under R-F operating conditions. Serially connected capacitors 126 and 128 are connected between the collector 118 of transistor 106 and the junction point between resistors 116 and 122. The mutually connected ends of the capacitors are connected to the emitter 120 of transistor 106.

In operation of the circuit, emitter resistor 122 limits current flow through the emitter and places the emitter above ground for R-F signals so that feed back from the collector to the emitter is established in proper phase through the capacitors which in effect comprise an R-F voltage divider. An LC tank circuit is formed from inductor 130 and capacitor 132. One terminal of the tank circuit is grounded and an input to the tank circuit is provided at a tap 134 on inductor 130 to which the collector 118 of transistor 106 is connected. The tank circuit is designed to resonate at the crystal frequency.

The second stage of the transmitter is an isolating amplifier denoted by 100 which includes a R-F choke 140 having one terminal thereof grounded. The other terminal is connected to a second tap 136 of coil 130 through a DC blocking capacitor 138. The inductance of coil 140 is designed to provide an input voltage thereacross which is applied to the emitter 142 of common base transistor 143.

The collector 146 of the transistor 143 drives a pi network including grounded ends of capacitors 148 and 152. The capacitors are joined through a connecting inductor branch 150. The purpose of the pi network is to provide optimum loading of the stub antenna 104 through the serially connected R-F coil 103. The output of the pi network is taken at the junction point between inductor 150 and capacitor 152 which is connected to coil 103 through a DC blocking capacitor 154. A R-F choke 160 is connected between the mutually connected ends of inductor 150 and capacitor 152 and the positive terminal of battery 28 to establish a DC bias connection to the collector 146 of transistor 143. The choke 160 permits passage of DC current but blocks the passage of R-F current.

Referring to FIGS. 2 and 5, the stub antenna 104 may be conveniently secured within insulative transmitter housing 20 in close proximity to the oscillator circuit 94 shown in FIG. 6. Also, as previously explained energization of the oscillator and isolating amplifier stages occurs upon closing of either or both sensor switches 66 and 66'. In FIG. 6, leads 73 and 76 are shown connected in circuit, it being understood that the opposite ends of the leads are connected to switches 66 and 66' as shown in FIG. 5. In a preferred embodiment of the present invention, the circuit components illustrated in FIG. 6 can be mounted on a printed circuit board (not shown) which in turn can be suitably secured within housing 20. As will be appreciated, the transmitter circuit shown in FIG. 6 can alternatively be fabricated from integrated circuit chips or field effect transistors having equivalent circuit functions.

In FIG. 8 there is shown a block diagram of the receiver 20 which in terms of the present description is located in the cab 10 of a tractor, as shown in FIG. 1. A conventional mobile mounted antenna 161 is connected across the input of a first R-F amplifier stage generally indicated by 162. The output of the amplifier stage drives a first input of mixer stage 164. The second mixer input is derived from a crystal oscillator 166. The output from the mixer stage drives a combined stage 170 including an I-F amplifier operating upon the I-F signal output of the mixer. The I-F amplifier output is connected to the input of a superregenerative second detector which permits the realization of maximum sensitivity with a minimum number of amplifier stages. When the transmitter of the present invention is in a dormant state, the superregenerative detector produces a noisy output. However, upon transmission of a signal from the transmitter, the second detector generates the modulating signal at the output thereof, which is employed as a control voltage for remote control equipment as hereinafter explained. A signal rectifier and filtering network 172 is driven by the output from the superregenerative second detector and is in turn connected to the input of an electronic switch 174. When noise is generated by the second detector, the rectifier in filter network 172 causes switch 174 to remain in a quiescent condition. However, when a transmitted signal is received, the network transforms the restored modulating signal from the output of the second detector to a control voltage which actuates switch 174. When the switch closes, an indicating light 176 is lit.

Referring to FIG. 7, there is shown the schematic of the receiver circuit which is seen to include a front end LC resonant tank circuit tuned to the carrier frequency and including an inductor 178 connected in parallel with a capacitor 180. The receiver antenna input terminals 184 are connected between a tap on inductor 178 and one ground terminal 182 of the tank circuit. The inductor 178 is actually the primary of a transformer having a secondary 188 inductively coupled to permit the presentation of a received signal to the R-F amplifier stage generally indicated by 162. One terminal of the transformer secondary 188 is connected to the emitter 190 of PNP transistor 186. The other terminal is connected to ground through a bypass capacitor 192. The junction point between the secondary 188 and capacitor 192 is connected to a source of positive voltage potential 196 through a path including emitter bias resistor 194 and connecting lead 195. The emitter terminal 200 of transistor 186 is connected to ground through a current limiting emitter resistor 202. A bypass capacitor 204 is connected across the emitter resistor thereby effectively connecting the emitter to ground during R-F operation. One end of a bias resistor 205 is connected to the base 200 of transistor 186, the opposite end of the bias resistor being connected to positive potential point 196 through connecting lead 195. A grounded bypass capacitor 207 is connected to the junction between bias resistor 205 and potential point 196 thereby creating an alternate ground path between the base 200 and ground, through resistor 205 and bypass capacitor 207. The latter mentioned grounded path connected to the base 200 of transistor 186 obviates the effect of the positive bias voltage upon the base during radio frequency operation of the receiver.

The collector terminal 206 of transistor 186 represents the output terminal of the R-F amplifier stage 16 which serves to amplify the signal received from a transmitter fastened to a vehicle wheel as hereinbefore described and which is normally off, except during periods of predetermined low tire pressure. The collector terminal is connected to a resonant tank circuit including capacitor 208 and primary winding 210 of an associated transformer. The parallel LC combination forms a sharply tuned circuit at the transmitter frequency. The amplified tuned signal generated by the latter mentioned tank circuit is transferred from the primary 210 to a secondary winding 218. The output across secondary 218 represents the input to the mixer stage generally indicated by 164. The base 216 of transistor 214 is connected to the first terminal of the secondary winding 218 thereby introducing a first input signal into the mixer stage. The opposite terminal of the secondary winding is connected to the positive potential source 196 through the series connection of a bias resistor 220 and connecting lead 195. This connection serves to bias the base during quiescent conditions.

It is desirable to include a R-F choke 222 between the resistor 220 and the connecting lead 195 in order to prevent the diversion flow of radio frequency current to the voltage source through lead 195. A current limiting resistor 224 is connected between ground and the junction point between secondary winding 218 and resistor 220. A bypass capacitor 226 is connected in parallel with the current limiting resistor 224 to eliminate its effect under R-F operating conditions. The emitter 228 of transistor 214 is properly biased by connecting the same to the positive potential point 96 through an emitter resistor 230 and connecting lead 195. An R-F choke 232 is serially connected in the latter mentioned path for reasons similar to those explained in connection with R-F choke 222.

An oscillator input is introduced at the emitter terminal through connecting lead 234 which is serially connected to the output of the crystal oscillator generally denoted by 166 through a DC blocking capacitor 236.

As will be noted from FIG. 7, the oscillator 166 is of the crystal type wherein the base input terminal 240 of a NPN transistor 238 is connected to a first terminal of a grounded crystal 242. The oscillator is crystal controlled to insure that the receiver is always tuned to the exact frequency of the alerting transmitter. A feed back loop between the collector 246 of transistor 238 and the base 240 thereof is achieved by connecting a load resistor 248 therebetween. The emitter 250 of transistor 238 is connected to the junction point between serially connected capacitors 254 and 256, which form an R-F voltage divider having a first grounded terminal and a second terminal connected to the base 240 of transistor 238. Thus, feedback from the collector to the emitter is accomplished with the attendant requirement for maintaining proper phase by employing capacitors 254 and 256. In order to properly bypass the emitter during quiescent conditions, a bypass capacitor 254 is connected between emitter 250 and the positive potential source 196 through connecting lead 195. The bypass capacitor 254 is connected in parallel with bias resistor 252 to preclude its operation during R-F conditions.

The collector 246 of transistor 238 is connected to a first terminal of a resonant LC tank circuit including an inductor 258 and a parallel connected capacitor 260. The opposite terminal of the tank circuit is connected to a grounded parallel RC combination including resistor 262 and capacitor 264. In this regard, resistor 262 serves as a current limiting collector bias resistor which is eliminated from circuit operation under R-F conditions by bypass capacitor 264 connected thereacross. The oscillator output is taken from a tap located on coil 258. As previously mentioned, this output is applied to the input of the mixer stage to the blocking capacitor 236.

The collector 266 of the mixer transistor 214 is connected to a first terminal of a resonant tank circuit including parallel connected capacitor 268 and primary winding 270, of an associated transformer. Thus, as will be appreciated, the collector of the transistor is tuned to the I-F frequency generated by the mixer stage. The other terminal of the latter mentioned tank circuit is connected to a parallel RC combination including collector current limiting resistors 272 and bypass capacitor 274, the resistor and capacitor being grounded. The I-F signal generated across the primary winding 270 of the associated tank circuit is transformed to a secondary winding 276 having a first ground terminal. The second terminal of the secondary drives a succeeding receiver stage generally denoted by 170 which serves an an I-F amplifier and superregenerative second detector. A PNP transistor 280 forms the heart of this receiver stage and performs an amplifier operation on the I-F signal applied thereto. In addition, the transistor is coupled with passive elements to accomplish superregenerative detection. As is well known in the art, a superregenerative second detector utilizes the well known radio principle of superregeneration to obtain extremely high sensitivity with a minimum number of amplifier stages. An input signal to the superregenerative stage is introduced into the emitter terminal 304 of transistor 280 through a serial path including DC blocking capacitor 282 which is connected to the unground terminal of transformer secondary 276. R-F coupling between the collector 284 and emitter 304 of transistor 280 is accomplished by a bridging capacitor 286. The resonant tank circuit including parallel connected conductor 288 and capacitor 290 provide a circuit for the superregenerative detector. It is noted that this stage is operated as a common-base self-quenched oscillator, with potentiometer 308 and parallel connected capacitor 310 serving as a quench-determining network. Inductor 306 is serially connected between emitter 304 of transistor 280 and the RC quench-determining network in order to isolate the transistor emitter from R-F ground. A capacitor 298 is connected between the base terminal 297 of transistor 280 and ground thereby serving as an R-F bypass capacitor. A current limiting base resistor 296 is connected between the base terminal 97 and ground. A second current limiting path is connected in parallel with resistor 296 and includes serially connected resistor 300 and capacitor 302. As will be appreciated, the second mentioned current limiting path becomes operative during R-F operation only. The current limiting grounded resistor 292 is connected to the "cold" end of the tank circuit comprising inductor 288 and capacitor 290. A capacitor 294 is connected in parallel with resistor 292 to bypass the same during R-F circuit operation. The collector of transistor 280 is R-F coupled to the base terminal by means of a coupling capacitor 312 connected between the "cold" end of the tank circuit and the base terminal 297 of transistor 280. It will be noted that the parallel LC network including conductor 288 and capacitor 290 to form a quench filter which suppresses the oscillations in the superregenerative stage.

The output from the superregenerative stage 170 is taken at the "cold" end of the LC output network. The superregenerative stage operates at the I-F frequency and during a "no signal" condition, this stage is exceedingly noisy and the noise voltage is rectified by the signal rectifier and filter generally indicated by 172 in FIG. 8 and more particularly includes a capacitor 314 having one end thereof connected to the output of the superregenerative stage. The opposite terminal of the capacitor is connected to a junction point 315 from which two parallel circuit branches emanate. The first such branch includes a diode 316, having an anode thereof connected to the capacitor 314, and a cathode connected to ground. The second circuit branch includes an oppositely directed diode 322 having a cathode connected to the junction point 315. The anode of the diode anode is connected to the negative terminal of a DC source of potential 326. The positive terminal is connected to the base 328 of a PNP transistor 330. The collector 332 of this transistor is connected to the collector 334 of the second PNP transistor 336, through a coupling resistor 338. The emitter 340 of transistor 330 is applied to the base input terminal 342 of the second transistor 336. It will be noted that the emitter 344 of the second transistor 336 is grounded. In order to properly bias the transistors 330 and 336, forming the heart of an electronic switch generally denoted by 174, the collector of transistor 336 is connected to the positive potential source 196 through a current limiting resistor 348 and a serially connected indicator lamp 176.

In operation of the receiver, during a "no signal" condition, the superregenerative stage 170 is exceedingly noisy and this noise is rectified by the components included in the generally indicated signal rectifier and filter 172. This voltage cancels the bias established by the DC potential source 326. When a signal is present at the receiver antenna, the recovered modulating signal removes the effect of the cancelling voltage and may therefore be considered as a switch control voltage. Upon removal of the cancelling voltage, transistor 330 conducts thus placing a positive voltage on the base of transistor 336 which in turn causes it to conduct thereby permitting current flow through indicating lamp 176. Thus, when the vehicle operator notices the signalling or alarm status of the indicator light, he is made aware of the dangerous condition existing due to the low pressure in one or more tires. With this information at hand, the operator may bring his vehicle to a safe halt before any deleterious effects results.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In a system for detecting a reduction in pressure of the inflating medium of a pneumatic tire mounted on a rotatable wheel of a vehicle, the improvement comprising:

a housing, means by which said housing is mounted on said wheel; a cylinder, means by which said cylinder is fixedly mounted within the housing, said cylinder having an inlet means connected to sense the tire pressure, a piston reciprocatingly received within the cylinder and including a stem portion extending exteriorly of the cylinder; switch means, means by which said switch means is mounted within the housing for actuation by the piston in response to displacement of the stem portion thereof to a position corresponding to a predetermined pressure at the inlet of the cylinder;

adjustable bias means engageable with the piston for varying said predetermined pressure without disassembly of the cylinder from the housing and the housing from the device;

said switch means having fixed and movable contact means, second biasing means urging said movable contact into engagement with said fixed contact, said stem portion having an end portion which engages said movable contact means to thereby maintain said fixed and movable contacts in an open position when the tire pressure is above the stated predetermined pressure;

a transmitter, means connecting the fixed and movable contacts of said switch means to the transmitter for energizing the latter in response to closure of the contacts, antenna means connected to the transmitter for radiating a modulated signal when the transmitter is energized;

a receiver means; said receiver means being responsive to the transmitted signals; and, an alarm device responsive to the receiver output for signaling the occurrence of an abnormal pressure condition.

2. The system described in claim 1 wherein said receiver means is positioned at a location remote from the transmitter; said alarm device being responsive to the receiver output for alerting a vehicle operator of an abnormal condition.

3. The system of claim 1 and further including a dual wheel assembly having second tire and wheel to form concentrically disposed inflatable tires mounted on separate wheels, said housing being coaxially mounted on only one wheel and further including at least two pressure sensors, each sensor having the recited piston and cylinder with each cylinder enclosing one of the pistons, and inlet means connecting one of the cylinders to one of the tires to enable each of the switch means to be actuated in response to displacement of an associated piston indicative of a preselected abnormal inlet pressure to the cylinder, means connecting each of the switch means to the transmitter for energizing the latter in response to the occurrence of abnormal tire pressure in either of the tires, and said antenna means being secured in close proximity to the transmitter and connected to the output thereof for radiating a modulated signal when the transmitter is energized.

4. The system set forth in claim 3 wherein the transmitter comprises a crystal controlled R-F oscillator having a tuned output, an isolating amplifier having an output, the amplifier being driven by the oscillator and a passive pi network connected to the amplifier output for optimum loading of the antenna means connected to the pi network.

5. The system of claim 1 wherein said receiver is a remote control receiver adapted for actuating a utilization device, the receiver comprising an antenna, R-F amplifier having an input connected to said antenna, a stable oscillator, a mixer stage for combining signals from the amplifier and oscillator and generating a resultant I-F signal therefrom, an I-F amplifier driven by the mixer stage, superregenerative means having a noisy output in absence of a receiver input signal, the superregenerative means serving as a second detector in response to the output of the I-F amplifier, the output of the superregenerative being connected to the utilization device for actuating the same.

6. The system set forth in claim 5 including wave shaping means operative upon the output of the superregenerative means to form a control voltage depending upon the input condition of the receiver, and switch means actuated by said control voltage when a predetermined input condition of the receiver exists.

7. The system set forth in claim 6 wherein said alarm means connected to the switch means for energization in response to actuation of the switch means indicating said predetermined input condition.